(12) United States Patent
Vinay

(10) Patent No.: US 11,238,528 B2
(45) Date of Patent: Feb. 1, 2022

(54) SYSTEMS AND METHODS FOR CUSTOM RANKING OBJECTIVES FOR MACHINE LEARNING MODELS APPLICABLE TO FRAUD AND CREDIT RISK ASSESSMENTS

(71) Applicant: American Express Travel Related Services Company, Inc., New York, NY (US)

(72) Inventor: Vishwa Vinay, Bangalore (IN)

(73) Assignee: American Express Travel Related Services Company, Inc., New York, NY (US)

( * ) Notice: Subject to any disclaimer, the term of this patent is extended or adjusted under 35 U.S.C. 154(b) by 983 days.

(21) Appl. No.: 15/387,854

(22) Filed: Dec. 22, 2016

(65) Prior Publication Data

US 2018/0182029 A1    Jun. 28, 2018

(51) Int. Cl.
G06Q 40/00 (2012.01)
G06Q 40/02 (2012.01)
G06Q 10/06 (2012.01)
G06N 20/00 (2019.01)

(52) U.S. Cl.
CPC .......... *G06Q 40/025* (2013.01); *G06N 20/00* (2019.01); *G06Q 10/067* (2013.01)

(58) Field of Classification Search
CPC .............. G06Q 30/02; G06Q 20/4016; G06Q 30/0201; G06Q 30/0255; G06Q 20/10; G06Q 20/40; G06Q 30/0269; G06Q 40/02
See application file for complete search history.

(56) References Cited

U.S. PATENT DOCUMENTS

| | | | |
|---|---|---|---|
| 7,865,427 B2* | 1/2011 | Wright | G06Q 20/04 705/38 |
| 8,521,631 B2* | 8/2013 | Abrahams | G06Q 40/02 705/36 R |
| 9,600,779 B2* | 3/2017 | Hoover | G06Q 30/06 |
| 9,697,469 B2* | 7/2017 | McMahon | G06N 20/20 |
| 10,289,751 B2* | 5/2019 | Aliferis | G06F 16/28 |
| 2001/0056398 A1* | 12/2001 | Scheirer | G06Q 40/02 705/38 |

(Continued)

FOREIGN PATENT DOCUMENTS

WO    WO-2016004075 A1 *    1/2016    .......... G06F 9/5066

OTHER PUBLICATIONS

Sabato, Gabriele.Assessing the Quality of Retail Customers: Credit Risk Scoring Models. IUP Journal of Financial Risk Management 7.1/2: 35-43. IUP Publications. (Mar.-Jun. 2010).*

(Continued)

*Primary Examiner* — Mike Anderson
(74) *Attorney, Agent, or Firm* — Sterne, Kessler, Goldstein & Fox P.L.L.C.

(57) ABSTRACT

A system for analyzing risk using machine learning models may be trained using a data set to generate a risk assessment model that is optimized for metrics commonly used in for financial risk evaluation. The metrics may include Gini and CaptureRate, for example. The system may receive a request for a financial service, and generate a risk assessment by applying the risk assessment model to factors associated with the request. The system may also decide on the request in response to the risk assessment.

17 Claims, 4 Drawing Sheets

(56) References Cited

U.S. PATENT DOCUMENTS

| | | | |
|---|---|---|---|
| 2002/0133721 A1* | 9/2002 | Adjaoute | G06Q 20/4016 |
| | | | 726/23 |
| 2006/0010093 A1* | 1/2006 | Fan | G06F 16/40 |
| 2009/0192810 A1* | 7/2009 | Filatov | G06Q 10/00 |
| | | | 705/318 |
| 2011/0066454 A1* | 3/2011 | Rosauer | G06Q 10/067 |
| | | | 705/4 |
| 2014/0351109 A1* | 11/2014 | Peng | G06Q 40/00 |
| | | | 705/35 |
| 2015/0026027 A1* | 1/2015 | Priess | G06Q 20/4016 |
| | | | 705/35 |
| 2016/0042354 A1* | 2/2016 | Canis | G06Q 20/4016 |
| | | | 705/44 |
| 2016/0104163 A1* | 4/2016 | Aquino | G06Q 40/12 |
| | | | 705/44 |
| 2017/0177309 A1* | 6/2017 | Bar-Or | G06F 8/34 |
| 2017/0286502 A1* | 10/2017 | Bar-Or | G06F 16/2423 |
| 2017/0286526 A1* | 10/2017 | Bar-Or | G06F 8/60 |
| 2017/0351511 A1* | 12/2017 | Bar-Or | G06F 8/34 |
| 2018/0240028 A1* | 8/2018 | Baracaldo Angel | G06N 20/00 |
| 2018/0357714 A1* | 12/2018 | So | G06N 5/022 |

OTHER PUBLICATIONS

Sabato, Gabriele. Assessing the Quality of Retail Customers: Credit Risk Scoring Models. IUP Journal of Financial Risk Management 7.1/2: 35-43. IUP Publications. (Mar.-Jun. 2010). (Year: 2010).*

* cited by examiner

SYSTEMS AND METHODS FOR CUSTOM RANKING OBJECTIVES FOR MACHINE LEARNING MODELS APPLICABLE TO FRAUD AND CREDIT RISK ASSESSMENTS

FIELD

The present disclosure relates to custom ranking systems and methods for machine learning models applicable to fraud assessments and credit risk assessments.

BACKGROUND

Credit risks can arise when credit is extended to account holders that are likely to default. Financial institutions are particularly concerned with offering credit based on the perceived risk of default associated with the credit. Credit accounts that go into default are often losses.

Once credit is extended to card members, their accounts may occasionally be compromised. Financial institutions offering transaction accounts may protect users against fraud by reimbursing account holders for fraudulent charges. As such, financial institutions seek to minimize fraud in order to minimize their losses as a result of reimbursement expenses. Financial institutions may implement risk assessment systems to assess risk, but those systems have traditionally been only as effective as the expert-written rules guiding the systems.

Models may be used in some scenarios to predict a likely outcome. For example, models may be built and used in assessing credit risk and fraud risk. However, the models are often sub-optimal for use in a particular scenario, as there may be a gap between the loss function that machine learning uses and the metric used to evaluate the accuracy and/or precision of the model. Inaccurate models result in lower fraud capture rates (i.e., more fraud goes undetected) or inefficient characterization of credit risk of customers (i.e., more defaults occur than expected). Thus, inaccurate models result in greater losses for financial institutions.

SUMMARY

A system, method, and computer readable medium (collectively, the "system") is disclosed for analyzing risk using machine learning models. The system may be trained using a data set to generate a risk assessment model that is optimized for at least two metrics. The metrics may include Gini and CaptureRate, for example. The system may receive a request for a financial service, and generate a risk assessment by applying the risk assessment model to factors associated with the request. The system may also decide on the request in response to the risk assessment.

In various embodiments, the system may swap a first value and a second value from a metric of the at least two metrics in response to the first value being lower than a predetermined threshold. A pair may be assigned a numeric weight (e.g. 1 or 2) indicating the importance of ordering them accurately with respect to their known risk. In various embodiments, a pair of the metric may be assigned a value selected from a set including −1, 0, and 1. The pair of the metric may also be assigned a value selected from a set including 1 and 2. The pair of the metric may be assigned the value of 2 in response to a first member for the pair being greater than the predetermined threshold and a second member of the pair being less than the predetermined threshold.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
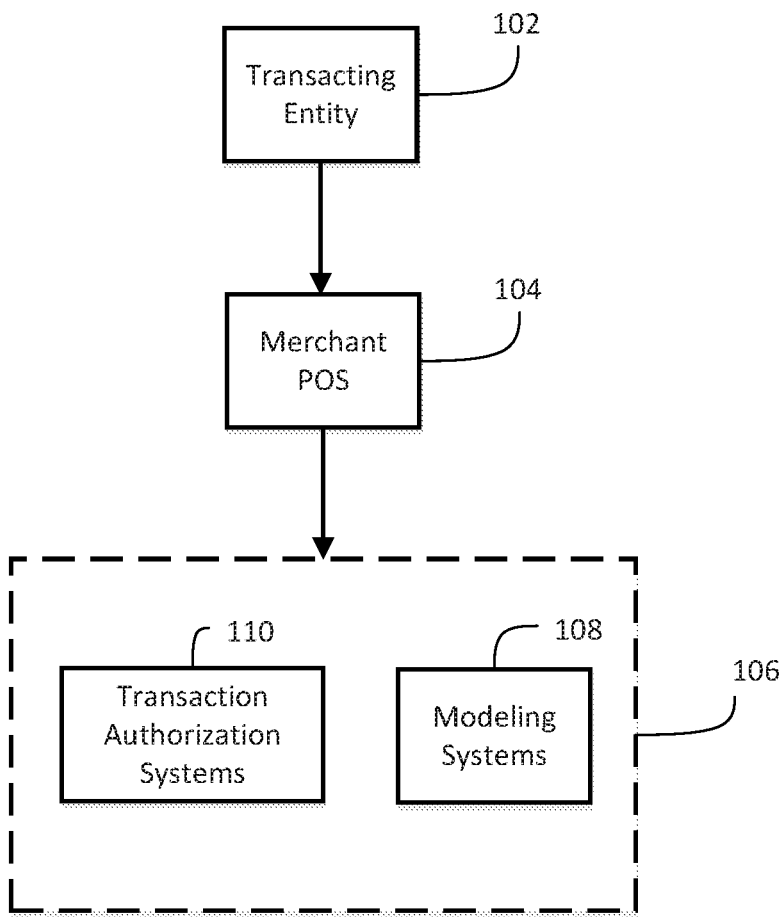
FIG. 1 illustrates a system for implementing custom ranking for machine learning models to model fraud risk, in accordance with various embodiments.

Referring to FIG. 1, system 100 for modeling fraud risk using machine learning models for risk assessment is shown, in accordance with various embodiments. System 100 includes modeling systems 108 that estimate a likelihood of fraud and/or likelihood of default for various entities and/or transactions. Modeling systems 108 may be maintained by a financial institution 106 and have access to credit worthiness data, historic transaction data, historic fraudulent transaction data, as well as current transaction and credit application data. The data may be closed loop data collected from records of charge for each transaction and/or application data collected from agencies and submitted by applicants.

Transacting entity 102 may have a transaction account with the financial institution 106, for example. The transaction account holder may use the transaction account to purchase items at merchant POS 104, and fraudulent entities that have information from the transaction account may attempt to make fraudulent transactions at merchant POS 104. Merchant POS 104 may include an in-store point of sale, an online point of sale, a portable device having transaction capabilities (e.g., a smartphone or tablet), or any other computing device that communicates with financial institution 106 as part of a routine to process, authorize and/or complete transactions. Transaction authorization systems 110 of financial institutions may approve or decline the various transaction requests received from merchant POS 104 based in part on results from the fraud analysis of modeling systems 108. As a result, financial institution 106 may maintain a historical record of transactions suitable for use in future fraud detection and modeling. The historical record of transactions may be used to facilitate machine learning algorithms.

Modeling systems 108 may take the form of a computer or processor, or a set of computers/processors, although other types of computing units or systems may be used, including servers, mainframes, computing clusters. The modeling systems 108 may include different computing systems to both build the model and apply the built model. The model-building process (also referred to herein as model fitting) may be computationally intensive processes that incorporate large amounts of data. In that regard, computing devices of modeling systems 108 used to build the models may include more powerful computing devices such as servers, mainframes, computing clusters, or combinations thereof. Once the model is built, it can be placed on less powerful devices to 'score' an incoming transaction (for fraud and/or credit risk) by applying the model. In that regard, the below equations and techniques may be used to augment the model building process.

Less powerful computing devices may also be used to apply models in various embodiments such as, for example, laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of risk assessment using machine learning models as described herein. For generating a large scale model such as ones used by large financial institutions, a mainframe computing system or computing cluster may run for time periods on the order of days to generate a model. Thus, generating models on machines with lower processing power may result in significantly longer processing times.

Figure 2:
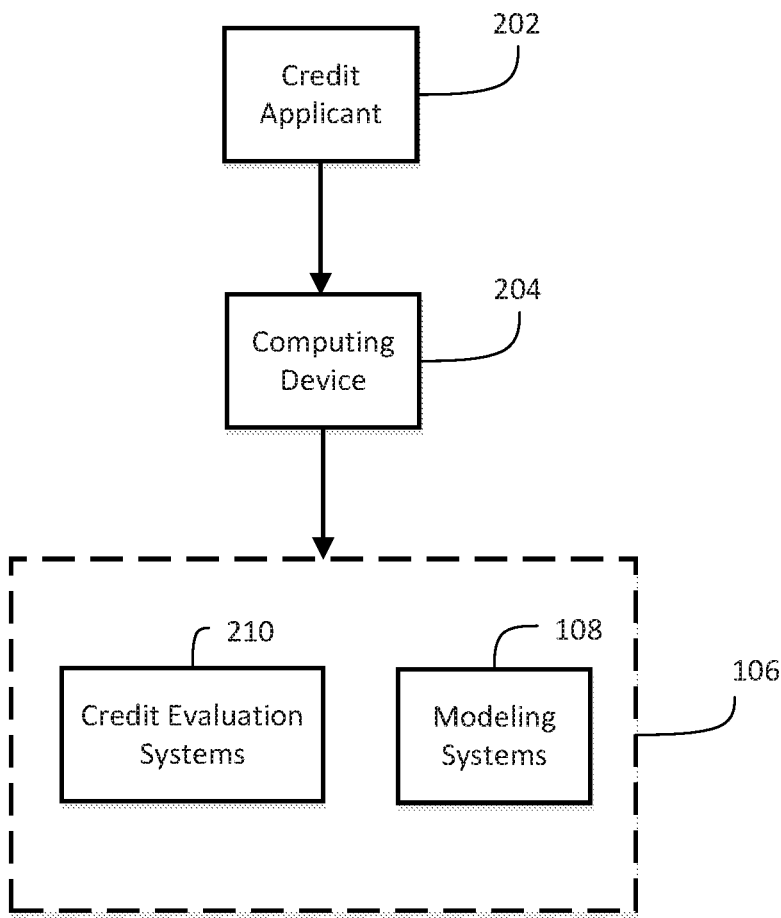
FIG. 2 illustrates a system for implementing custom ranking for machine learning models to model credit default risk, in accordance with various embodiments.

Referring to FIG. 2, system 200 for modeling credit risk using machine learning models for risk assessment is shown, in accordance with various embodiments. System 200 is similar to system 100 and may include modeling systems 108 that estimate a likelihood of fraud and/or likelihood of default for various entities and/or transactions. Credit applicants 202 may use computing devices 204, which may be any computing devices described herein, to submit credit applications and/or request credit line adjustments. Modeling systems 108 may be maintained by a financial institution 106 and have access to credit worthiness data, historic transaction data, historic fraudulent transaction data, current transaction, credit application data, and other data relevant to financial institutions. The data may be closed loop data collected from records of charge for each transaction and/or application data collected from agencies and submitted by applicants. Credit evaluation systems 210 may make credit decisions based on the results of risk analysis using models built with machine learning algorithms.

In various embodiments, modeling systems 108 of FIG. 1 and/or FIG. 2 may use machine learning to generate accurate models. Models implemented by modeling systems 108 may use logistic regression and gradient boosted machines (GBMs), for example, to facilitate machine learning. Although logistic regression and GBMs are described herein as particular examples, the present disclosure envisions other model types such as, for example, neural networks, random forests, etc. being similarly adapted. Building a model using classification models may include two components: model fitting and model evaluation. Model fitting using logistic regression may include identifying a set of weights, one per feature/variable. Model fitting using GBMs may include identifying the structure of a tree, including which feature to split at each node, and the corresponding thresholds. Both are described in greater detail below.

The second component of building models in modeling systems 108 includes model evaluation, i.e., validating the accuracy/precision/validity of the models. Modeling systems 108 of the present disclosure may evaluate the models using metrics such as Accuracy, Gini, and CaptureRate. Accuracy evaluates how effective is the model at predicting the outcome of interest. Gini evaluates how effective the ordering induced by model output is in separating the two groups in a binary classification problem. CaptureRate describes the fraction of the known positive labelled items that are placed high up in the ordering induced by output score. CaptureRate may also be referred to as critical-bucket-capture or recall in various embodiments. Accuracy, Gini, and CaptureRate, along with their integration into modeling systems 108, is described in greater detail below.

Modeling systems 108 may align model fitting and model evaluation described above to guide model fitting towards a model that captures aspects of evaluation that are relevant to the use case (e.g., fraud detection and credit risk assessment). Modeling systems 108 may use tailored objective/loss functions during model fitting towards the desired metrics (i.e., Gini and CaptureRate).

Modeling systems 108 may use one or more of three metrics for evaluation of scoring models. The first is Accuracy. Accuracy describes how well does the predicted probability ($p_i$) match the empirically observed probability ($y_i$). The second is Gini. Gini describes how well the ordering does over items induced by the predicted probability $p_i$ match the ordering imposed by $y_i$. Modeling systems 108 may define Gini as equal to $2*A-1$, where A is the "area under the curve" (AUC) plotting the true-positive rate versus the false-positive rate over the ordering imposed by $p_i$, as described by equations 1 and 2 below:

$$A = \frac{1}{N_P * N_N} \sum_{i \in P} \sum_{j \in N} f(i, j) \tag{1}$$

$$\begin{aligned} f(i, j) &= 1 \text{ if } (p_i - p_j) > 0 \\ &= 0.5 \text{ if } p_i = p_j \\ &= 0 \text{ if } (p_i - p_j) < 0 \end{aligned} \tag{2}$$

P is the class containing all positive instances (e.g. those who have defaulted in the past), and this set contains $N_P$ elements. And similarly. N is the set of negative instances (e.g., those who have not defaulted in the past) and contains $N_N$ elements.

Modeling systems 108 may use CaptureRate to evaluate the known positive labels. In that regard, CaptureRate may determine how many known positives occupy the top-most few ranking positions. Capture rate may be defined by equation 3 below:

$$CaptureRate = \frac{1}{N_P} \sum_{r<T} \mathbb{1}_{y_r=+1} \quad (3)$$

where 'T' here represents a threshold (for e.g., 2% of the population size), and a good model is able to place the positive labeled quantities at the top. Gini is an ordering criterion over the entire list, and CaptureRate is focused on evaluation more at the top of the list. A model with perfect accuracy may tend to maximize the Gini and CaptureRate metrics. However, in many situations, a model may perform well on one metric but not on the other. Two pathological examples may be illustrative. First, in extreme class imbalance scenarios, the trivial classifier that always predicts the majority class may have high Accuracy but very low Gini. Second, scoring methods may be generated that maintain the ordering but do not get the right predicted value. For example, predicting (0.49, 0.51) for a (0, 1) pair. For these reasons, tailoring the model fitting process to explicitly consider both rank ordering, as well as accuracy, may be beneficial.

To that end, modeling systems 108 may use logistic regression for model fitting. Modeling systems 108 may begin with a set of N data points represented by $\{[x_i, y_i]\}$ with i=1 ... N. Each $x_i$ may be a set of independent variables (i.e., features) such that $x_i=[x_{i1} \ldots x_{if} \ldots x_{iF}]$, and the target variable $y_i \in \{0, 1\}$. That is, logistic regression for model fitting presents a binary classification problem aimed towards using the input data to produce a scoring function that predicts $p_i$, e.g. "Probability that user i will default in the next D days." The logit model does this by setting:

$$\ln\left(\frac{p_i}{1-p_i}\right) = s_i = \sum_f w_f * x_{if} \quad (4)$$

Stated another way, the log-odds of the probability of the event of interest is a weighted linear combination of features. From equation 4 we can determine:

$$\frac{p_i}{1-p_i} = e^{s_i} => p_i = e^{s_i} - p_i e^{s_i} \quad (5)$$

$$p_i(1+e^{s_i}) = e^{s_i} => p_i = \frac{e^{s_i}}{1+e^{s_i}} \quad (6)$$

$$p_i = \frac{1}{1+e^{-s_i}} \quad (7)$$

This is the sigmoid function. Because this is a binary classification problem, the probability of the inverse event (e.g. "Probability that user i will not default in the next D days") is given by equation 8 below.

$$1 - p_i = \frac{1}{1+e^{s_i}} \quad (8)$$

Model fitting may be described as the task of finding the optimal $W_f$ given the input data $\{[x_i, y_i]\}$. Model fitting may thus be done using a maximum likelihood estimation procedure. The negative log-likelihood $\mathcal{L}_a$ of the data, (where the 'a' stands for 'accuracy') is given by equation 9, derived from equations 8 and 4:

$$\mathcal{L}_a = -\ln \prod_i p_i^{y_i}(1-p_i)^{(1-y_i)} \quad (9)$$

$$= \sum_i (-y_i \ln p_i - (1-y_i)\ln(1-p_i))$$

$$= \sum_i \left(-y_i \ln \frac{p_i}{1-p_i} - \ln(1-p_i)\right)$$

$$\mathcal{L}_a = \sum_i (-y_i s_i + \ln(1+e^{s_i}))$$

Modeling systems 108 may be configured to minimize the negative log-likelihood $\mathcal{L}_a$ given in equation 9 with respect to the parameters $W_f$. To do this, modeling system 108 may use an iterative algorithm based on gradient descent. Modeling system 108 may start with an initial guess and perform successive refinements using the partial derivative of $\mathcal{L}_a$ with respect to $W_f$, as illustrated below by equations 10 and 11:

$$\frac{\partial \mathcal{L}_a}{\partial w_f} = \sum_i \frac{\partial \mathcal{L}_a}{\partial s_i} \cdot \frac{\partial s_i}{\partial w_f} \quad (10)$$

$$\frac{\partial \mathcal{L}_a}{\partial s_i} = -y_i + \frac{1}{1+e^{-s_i}} = p_i - y_i$$

$$\frac{\partial s_i}{\partial w_f} = x_{if} \quad (11)$$

$$\frac{\partial \mathcal{L}_a}{\partial w_f} = \sum_i (p_i - y_i) * x_{if}$$

This gives us our first alternative to update $W_f$:

$$w'_f = w_f - \eta \sum_i ((p_i - y_i) * x_{if}) \quad (12)$$

The learning rate parameter, $\eta$, in the equation above may be set by the use of a validation set. One option to do away with this parameter is to resort to the use of second order information in Newton's method. The term Newton's method is meant to refer to the numerical analysis technique, also known as the Raphson method, used to find successively better approximations to the roots of a real-valued function. The Newton method may use the Hessian matrix, H, where each entry is given by equation 13.

$$\mathcal{H}_{kf} = \frac{\partial}{\partial w_k}\left(\frac{\partial \mathcal{L}_a}{\partial w_f}\right). \quad (13)$$

Thus, the Hessian matrix may be derived as shown in equation 14:

$$\mathcal{H}_{kf} = \frac{\partial}{\partial w_k} \sum_i ((p_i - y_i) * x_{if}) \quad (14)$$

-continued $$\mathcal{H}_{kf} = \sum_i \left( x_{if} * \frac{\partial p_i}{\partial w_k} \right)$$

$$\mathcal{H}_{kf} = \sum_i (x_{if} * x_{ik} * p_i * (1 - p_i)) \qquad (14)$$

The Hessian matrix provides an iterative solution for obtaining the parameters that is may be illustrated using the matrix notation in equation 15:

$$\dot{w} = w + \mathcal{H}^{-1} \Delta \qquad (15)$$

If w*1 is the column vector containing the parameters $W_f$, H is the F*F Hessian matrix whose elements are populated as in equation 14, $H^{-1}$ is the inverse of the matrix, and $\Delta$ is the F*1 column vector containing the gradients as given in equation 11, we get equation 16:

$$\dot{w} = w - \eta * \Delta \qquad (16)$$

Modeling systems 108 using equation 15 over equation 16 may have the advantages of no nuisance parameter $\eta$ and use of second order information usually leads to faster convergence. Modeling systems 108 using equation 16 over equation 15 may include the avoiding use of the Hessian matrix, which can lead to numerical instability when correlations amongst input features, the $x_{if}$, exist.

Since modeling systems 108 may use datasets for credit/fraud risk model building, it can be configured on the assumption that input variables have been manually screened to only retain those with minimal collinearity. That is, modeling systems 108 may benefit from faster convergence during fitting by using the version described in equation 15.

In order to align the model fitting process with the ranking based metrics mentioned above (i.e., CaptureRate and Gini) we may optimize the AUC value discussed above. The AUC calculated as in equation 1 consists of discontinuous operations making gradient descent based optimization difficult. An alternative formulation of the AUC that might allow such an optimization can be derived using a likelihood based model for pair wise orderings, starting with the definitions in equation 17 below.

$$s_{ij} = s_i - s_j, \qquad (17)$$

where $s_i$ & $s_j$ are the scores of $i$ & $j$ as defined in (3)

$p_{ij}$ = probability that $i$ has a higher chance of defaulting than $j$ $$p_{ij} = \frac{1}{1 + e^{-s_{ij}}}$$

The definition of $p_{ij}$ in equation 17 is a smoothed equivalent of f (i, j) in equation 2, as may be seen by setting $s_i \gg s_j$ (i.e., $s_{ij} \gg 0$). The foregoing implies $p_{ij} \cong 1$, similar to f(i, j), and accordingly for the case when $s_i \ll s_j$. Beginning with a dataset of the form $\{[x_i, y_i]\}$ as identified above, a new target variable $y_{ij}$ may be constructed as follows:

$$y_{ij} = 1 \text{ when } i \in P \& j \in N$$

$$y_{ij} = 0 \text{ when } i \in N \& j \in P \qquad (18)$$

Similar to $\mathcal{L}_a$ discussed above, the negative log-likelihood $\mathcal{L}_o$ (where the 'o' stands for 'ordering') may be given by:

$$\mathcal{L}_o = -\ln \prod_{(i,j)} p_{ij}^{y_{ij}} (1 - p_{ij})^{(1-y_{ij})} \qquad (19)$$

$$= \sum_{(i,j)} (-y_{ij} \ln p_{ij} - (1 - y_{ij}) \ln(1 - p_{ij}))$$

We are working towards defining the partial derivative of $\mathcal{L}_o$ with respect to $W_f$.

$$\frac{\partial \mathcal{L}_o}{\partial w_f} = \sum_{(i,j)} \left( \frac{\partial \mathcal{L}_o}{\partial s_i} \cdot \frac{\partial s_i}{\partial w_f} + \frac{\partial \mathcal{L}_o}{\partial s_j} \cdot \frac{\partial s_j}{\partial w_f} \right) \qquad (20)$$

$$\frac{\partial \mathcal{L}_o}{\partial s_i} = \frac{\partial \mathcal{L}_o}{\partial s_{ij}} * \frac{\partial s_{ij}}{\partial s_i} = \frac{\partial \mathcal{L}_o}{\partial s_{ij}}$$

$$\frac{\partial \mathcal{L}_o}{\partial s_j} = \frac{\partial \mathcal{L}_o}{\partial s_{ij}} * \frac{\partial s_{ij}}{\partial s_j} = -\frac{\partial \mathcal{L}_o}{\partial s_{ij}} = -\frac{\partial \mathcal{L}_o}{\partial s_i}$$

Simplifying equation 20 yields:

$$\frac{\partial \mathcal{L}_o}{\partial w_f} = \sum_{(i,j)} \left( \frac{\partial \mathcal{L}_o}{\partial s_{ij}} \left( \frac{\partial s_i}{\partial w_f} - \frac{\partial s_j}{\partial w_f} \right) \right) \qquad (21)$$

And combining equation 21 with equation 22 and equation 23 yields equation 24, as shown below:

$$\frac{\partial s_i}{\partial w_f} = x_{if} \text{ and } \frac{\partial s_j}{\partial w_f} = x_{jf} \qquad (22)$$

$$\frac{\partial \mathcal{L}_o}{\partial s_{ij}} = -y_{ij} + \frac{1}{1 + e^{-s_{ij}}} \qquad (23)$$

$$\frac{\partial \mathcal{L}_o}{\partial w_f} = \sum_{(i,j)} \left( \left( -y_{ij} + \frac{1}{1 + e^{-s_{ij}}} \right)(x_{if} - x_{jf}) \right) = \sum_{(i,j)} ((p_{ij} - y_{ij})(x_{if} - x_{jf})) \qquad (24)$$

The second derivative of $\mathcal{L}_o$ may be calculated with respect to $W_f$ in equation 25 below:

$$\mathcal{H}_{kf} \sum_{(i,j)} = ((x_{if} - x_{jf}) * (x_{ik} - x_{jk}) * p_{ij} * (1 - p_{ij})) \qquad (25)$$

The first and second derivatives as in equation 11 above. The objectives ($\mathcal{L}_o$ and $\mathcal{L}_a$) may be used for other gradient descent based models such as, for example, neural networks once the derivatives are prepared.

Modeling systems 108 may use the two (hopefully complimentary) objectives, $\mathcal{L}_a$ and $\mathcal{L}_o$ in the following six ways in calculating the parameters $w_f$.

A) Modeling systems 108 may use the objectives for accuracy only, ignore $\mathcal{L}_o$, and optimize for $\mathcal{L}_a$. That is, modeling system 108 may use Gini and accuracy as evaluation metrics, but only accuracy for model-fitting.

B) Modeling systems 108 may use the objectives for ordering only (i.e., ignore $\mathcal{L}_a$, optimize purely for $\mathcal{L}_o$).

C) Modeling systems 108 may use the objectives for a combined objective. That is, modeling systems 108 may define a combined objective $\mathcal{L} = a\mathcal{L}_a + (1-a)\mathcal{L}_o$, and optimize for the combined objective. We now have a tradeoff parameter a that may be set via cross-validation.

D) Modeling systems 108 may use the objectives in a stochastically combined manner. For an example of stochastically combined objectives, see "Algorithm 1" in *Combined Ranking and Regression*, by D. Sculley, which is incorporated herein by reference in its entirety.

E) Modeling systems 108 may use the two objectives by ordering followed by calibration to fit a model using $\mathcal{L}_o$. Then freeze the weights, and train a 2-parameter model using $$\mathcal{L}_a \cdot p_i = \frac{1}{1+e^{-(\frac{s_i-\mu}{\sigma})}},$$

where the parameters μ & σ are set using a technique similar to Platt scaling.

F) Modeling systems 108 may use training vs. validation metrics and use one objective (e.g. $\mathcal{L}_a$) during training and the other objective (e.g., $L_o$) as a validation metric for model selection. Each of the six variants listed above may be tested to select one for a given context.

While the above solution is focused on leveraging logistic regression, GBM may be used for model building. As described above, a set of N data points $\{[x_i, y_i]\}$ with $i=1 \ldots N$ may be used. Each $x_i$ may be a set of independent variables (features) such that $x_i = \{[x_{i1} \ldots x_{if} \ldots x_{iF}]\}$, and the target variable $y_i \in \{-1, +1\}$ may be used. That is, modeling systems 108 may invoke the GBM as a binary classifier via a logit model:

$$\frac{1}{2}\ln\left(\frac{p_i}{1-p_i}\right) = s_i => p_i = \frac{1}{1+e^{-2 \cdot s_i}} \quad (26)$$

Just like the ±1 labels (rather than 0/1 in logistic regression as discussed above), the use of the ½ in the logit model is a matter of convention. The loss function that may be used in the case of GBMs is the negative binomial log-likelihood $\mathcal{L}_c$ of the data, (where the 'c' stands for 'classifier'):

$$\mathcal{L}_c = \Sigma_i \ln(1+e^{-2y_i s_i}) \quad (27)$$

To obtain a low value for $\mathcal{L}_c$, the model may predict a high positive score $S_i$ when the label is $y_i=+1$ and low negative score when $y_i=-1$. GBMs may be built in an iterative manner, one tree at a time, continually reducing the loss in equation 27. Modeling systems may have the target for the $t^{th}$ tree be the 'pseudo-response' (i.e., the negative of the derivative of the loss with respect to the current score) for each data point.

$$\tilde{y}_i = -\frac{\partial \mathcal{L}_c}{\partial s_i} = \frac{2y_i}{1+e^{2y_i s_i}} \quad (28)$$

This target is also may be referred to herein as the residual. The values associated with the $k^{th}$ leaf node of the $m^{th}$ tree is given by:

$$\gamma_{km} = \text{argmin}_\gamma \Sigma_{x_i \in R_{km}} \ln(1+e^{-2y_i(s_i+\gamma)}) \quad (29)$$

where $R_{km}$ is the set of instances that reach a particular node. Equation 29 may use the loss function defined in equation 27 to define the value associated with each node as being the one that minimizes that loss. Finding this is usually done via one Newton-Raphson step from γ=0, giving:

$$\gamma_{km} = \frac{-\sum_{x_i \in R_{km}} \frac{\partial \mathcal{L}_c}{\partial s_i}}{\sum_{x_i \in R_{km}} \frac{\partial^2 \mathcal{L}_c}{\partial s_i^2}} \quad (30)$$

$$\frac{\partial^2 \mathcal{L}_c}{\partial s_i^2} = \frac{4 * y_i^2 * e^{2y_i s_i}}{(1+e^{2y_i s_i})^2} \quad (31)$$

Given that $y_i^2=1$, and the numerator of equation 30 is available from equation 28, equation 32 may be derived as follows:

$$\gamma_{km} = \frac{\sum_{x_i \in R_{km}} \tilde{y}_i}{\sum_{x_i \in R_{km}} \frac{4 * e^{2y_i s_i}}{(1+e^{2y_i s_i})^2}} \quad (32)$$

Equation 32 may be simplified to:

$$\gamma_{km} = \frac{\sum_{x_i \in R_{km}} \tilde{y}_i}{\sum_{x_i \in R_{km}} |\tilde{y}_i|(2-|\tilde{y}_i|)} \quad (33)$$

As evident from this description, the specific loss function enters into the general GBM algorithm in two places: the target values for the next tree of equation 28, and the leaf values for a given node of equation 33. The loss function may also affect the splitting of each node in one of two ways: entropy minimization or directly minimizing the loss function. Regardless of which node splitting criteria modeling systems 108 use, the recipe for building a GBM model involves computing the first and second gradients of the loss function (with respect to the current model score), and consuming this appropriately.

The pair-wise Loss Function described above with respect to logistic regression may also be applicable for GBM. As before, consider $S_{ij}=S_i-S_j$, with a version of the negative binomial log-likelihood of equation 27 for pair-wise events (with 'p' standing for pair-wise):

$$\mathcal{L}_p = \sum_{(i,j)} \ln(1+e^{-2y_{ij}s_{ij}}) \quad (34)$$

As before, $y_{ij}=+1$ when $i \in P$ & $j \in N$ and $y_{ij}=-1$ when $i \in N$ & $j \in P$, and we do not consider same-label pairs. In the GBM context, we first need to define $$\tilde{y}_i = \frac{\partial \mathcal{L}_p}{\partial s_i}$$

(as in equation 27).

$$\frac{\partial \mathcal{L}_p}{\partial s_i} = \sum_{(i,j)} \frac{\partial \mathcal{L}_p}{\partial s_{ij}} = \sum_{(i,j)} 2 * y_{ij} * (p_{ij}-1) \quad (35)$$

where $$P_{ij} = \frac{1}{1+e^{-2s_{ij}}}.$$

The second gradient, $$\frac{\partial^2 \mathcal{L}_p}{\partial s_i^2},$$

that may be used for computing the lead node values may also be defined as:

$$\frac{\partial^2 \mathcal{L}_p}{\partial s_i^2} = \sum_{(i,j)} \frac{\partial^2 \mathcal{L}_p}{\partial s_{ij}^2} = \sum_{(i,j)} 4 * p_{ij} * (1 - p_{ij}) \quad (36)$$

Using these derivatives for the residuals and leaf values respectively yields:

$$\check{y}_i = -\frac{\partial \mathcal{L}_p}{\partial s_i} = \sum_{(i,j)} 2 * y_{ij} * (1 - p_{ij}) \quad (37)$$

$$\gamma_{km} = \frac{\sum_{x_i \in R_{km}} \check{y}_i}{\sum_{x_i \in R_{km}} \sum_{(i,j)} 4 * p_{ij} * (1 - p_{ij})} \quad (38)$$

The above equations 37 and 38 may be used in modeling systems 108 to implement a pair-wise loss based version of the GBM.

The pair-wise loss function has an equivalence with Gini, as described above. Modeling systems 108 may also build models that attain a good CaptureRate evaluation. To this end, modeling systems 108 may attach a weight to every pair in equation 37 and equation 38 above. The weight may reflect how much the given metric of choice would change were the two elements of the pair swapped in an ordered list.

Figure 3A:
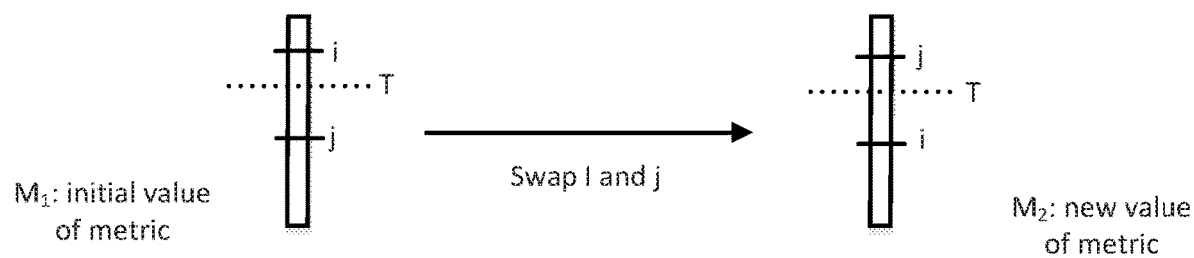
FIG. 3A illustrates a value swap of a first metric comprising an ordered pair to generate a new metric, in accordance with various embodiments.

With reference to FIG. 3, the initial value of the metric ($M_1$) may be obtained by sorting all items by the current value of the model score. The new value of the metric ($M_2$) may be obtained by swapping only the two items involved, and keeping every other element fixed, as illustrated in FIG. 3A. $\Delta M_{12}$ may be defined as $\Delta M_{12}=M_2-M_1$, which may be used in the residual and leaf node calculations as follows:

$$\check{y}_i = -\frac{\partial \mathcal{L}_p}{\partial s_i} = \sum_{(i,j)} 2 * y_{ij} * (1 - p_{ij}) * \Delta M_{ij} \quad (39)$$

$$\gamma_{km} = \frac{\sum_{x_i \in R_{km}} \check{y}_i}{\sum_{x_i \in R_{km}} \sum_{(i,j)} 4 * p_{ij} * (1 - p_{ij}) * \Delta M_{ij}} \quad (40)$$

Figure 3B:
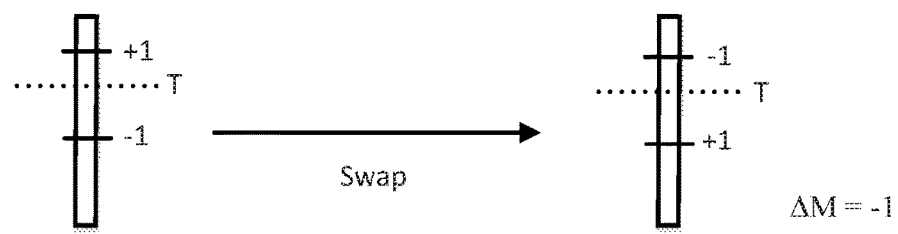
FIG. 3B illustrates a value swap of a metric comprising an ordered pair to generate a ΔM value, in accordance with various embodiments.

CaptureRate may be described as the fraction of known positives that have been placed above a specified threshold T. This metric is also sometimes referred to as Recall. Therefore, for a predetermined threshold T and the current ranks of the two items i and j in a pair, table T1 below specifies how swapping the two items as shown in FIG. 3B would change the CaptureRate.

TABLE T1 swapping elements to change CaptureRate.

|  | $r_j < T$ | $r_j > T$ |
|---|---|---|
| $r_i < T$ | $\Delta M_{ij} = 0$ | $\Delta M_{ij} = -1$ |
| $r_i > T$ | $\Delta M_{ij} = +1$ | $\Delta M_{ij} = 0$ |

As can be seen from in table T1, only cross-pairs (i.e., those where one element is above the threshold and one is below) have a value of $\Delta M_{ij}$ that is non-zero. From equation 39 and equation 40, when $\Delta M_{ij}=0$ the pair does not contribute towards the final CaptureRate. To prevent non-contribution of pairs, modeling system 108 may define $\Delta \tilde{M}_{ij}=2^{|\Delta M_{ij}|}$, which leads to the following table T2:

TABLE T2 defining $\Delta \tilde{M}_{ij} = 2^{|\Delta M_{ij}|}$.

|  | $r_j < T$ | $r_j > T$ |
|---|---|---|
| $r_i < T$ | $\Delta \tilde{M}_{ij} = 1$ | $\Delta \tilde{M}_{ij} = 2$ |
| $r_i > T$ | $\Delta \tilde{M}_{ij} = 2$ | $\Delta \tilde{M}_{ij} = 1$ |

By setting T to be the size of the dataset, using the above table makes equation 39 and equation 40 equivalents to equation 37 and equation 38, respectively. Applying the above principles to modeling systems 108 may enable modeling systems 108 to use machine learning with a loss function that has both good Gini and CaptureRate metrics, as described above. Equations 39 and 40 thus contain "$\Delta Mij$", and the specific numeric value used for a particular pair (i, j) can be chosen from either Table T1 or Table T2. In response to selecting a value from table T1, is result may be closer to the actual metric (e.g., CaptureRate) being used. In response to selecting a value from table T2, non-contributing pairs may be removed while the procedure is distance some from the original metric (e.g., CaptureRate). The suggestion in table T2 for $2^{|M_{ij}|}$ is just one of many possible value assignments schemes. For example, the '2' may be replaced with any positive integer to yield variants that weight the "cross-pairs" more than the other pairs.

Figure 4:
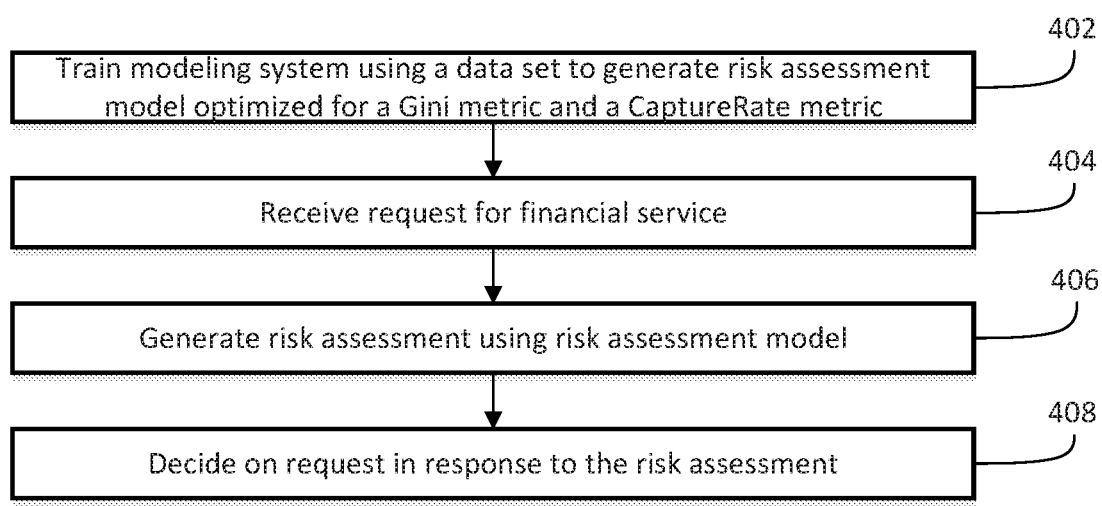
FIG. 4 illustrates a process for custom ranking systems and methods for machine learning models, in accordance with various embodiments.

Referring now to FIG. 4, a process 400 for building a model for estimation of fraud risk and/or default risk is shown according to various embodiments. Process 400 may tend to optimize risk assessment using machine learning for both the Gini and CaptureRate metrics with the above described techniques. In that regard, models built using the above process may tend to be more accurate with respect to various metrics.

In various embodiments, modeling system 108 may be trained using a data set to generate a risk assessment model optimized for a Gini metric and a CaptureRate metric (Step 402). A request for a financial service may be received (Step 404). The request for a financial service may include a transaction request or a credit request. A risk assessment may be generated using the risk assessment model (Step 406). The risk assessment may be made by comparing the factors associated with the request to the risk assessment model. A decision may be made on the request in response to the risk assessment (Step 408).

The disclosure and claims do not describe only a particular outcome of risk assessment using machine learning models, but the disclosure and claims include specific rules for implementing the outcome of risk assessment using machine learning models that render information into a specific format that is then used and applied to create the desired results of risk assessment using machine learning models, as set forth in McRO, Inc. v. Bandai Namco Games America Inc. (Fed. Cir. case number 15-1080, Sep. 13, 2016). In other words, the outcome of risk assessment using machine learning models can be performed by many different types of rules and combinations of rules, and this disclosure includes various embodiments with specific rules. While the absence of complete preemption may not guarantee that a claim is eligible, the disclosure does not sufficiently preempt the field of risk assessment using machine learning models at all. The disclosure acts to narrow, confine, and otherwise tie down the disclosure so as not to cover the general abstract idea of just risk assessment. Significantly, other systems and methods exist for risk assessment, so it would be inappropriate to assert that the claimed invention preempts the field or monopolizes the basic tools of risk assessment. In other words, the disclosure may not prevent others from assessing risk, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information about risk assessment and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information about risk assessment of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) relating to risk assessment using machine learning models to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of risk assessment using machine learning models, using a system for co-marketing the "look and feel" of the host web page with the product-related content information of an advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment". "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it may be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to transaction account may include any account that may be used to facilitate a financial transaction.

Phrases and terms similar to financial institution or transaction account provider may include any entity that offers transaction account services. Although often referred to as a "financial institution." the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to merchant, supplier or seller may include any entity that receives payment or other consideration. For example, a supplier may request payment for goods sold to a buyer who holds an account with a transaction account issuer.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING. AND MAINTAINING BIG DATA USE CASES and filed on Nov. 18, 2015; U.S. Ser. No. 14/944, 849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., . . . a MICROSOFT®, Word® document, a MICROSOFT® Excel®, document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art may appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it may become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As may be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet; Internet; point of interaction device, (point of sale device, personal digital assistant (e.g., IPHONE®, BLACKBERRY®), cellular phone, kiosk, etc.), online communications, satellite communications, off-line communications, wireless communications transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT®, Access® or MICROSOFT® SQL Server®) by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN. 1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computers discussed herein may provide a suitable API interface, website, or other Internet-based user interface which is accessible by users and/or interfacing programs. In one embodiment, the MICROSOFT® INTERNET INFORMATION SERVICES® (IIS). MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server. ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT, Active Server Pages, assembly, PERL, PHP, awk, Python, Visual Basic, SQL Stored Procedures, PL/SQL, any UNIX shell script, and extensible markup language, (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., . . . systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Moreover, where a phrase similar to 'at least one of A. B. and C' or 'at least one of A, B. or C' is used in the claims or specification, it is intended that the phrase be interpreted to mean that A alone may be present in an embodiment, B alone may be present in an embodiment. C alone may be present in an embodiment, or that any combination of the elements A, B and C may be present in a single embodiment; for example, A and B. A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    training, by a computing device, a modeling module to detect and prevent fraudulent online activity associated with at least one merchant, said training comprising performing a continuous, iterative validation of electronic transaction data via an executed loss function algorithm based at least on a Gini metric derived from an area under curve (AUC) plot and a capture rate metric of labeled data within the electronic transaction data, wherein the training further comprises:
        swapping, by the computing device, a first value and a second value from one metric of the Gini metric and the capture rate metric in response to the first value being lower than a predetermined threshold;
    dynamically generating and updating, by the computing device, via the trained modeling module, a risk assessment model, such that the risk assessment model is updated in accordance with the training of the modeling module;
    receiving, by the computing device, a request for an electronic transaction via an electronic financial service;
    generating, by the computing device, a risk assessment by applying the generated risk assessment model to factors associated with the electronic transaction; and
    deciding, by the computing device, on the request in response to the risk assessment, said decision triggering a point-of-sale (POS) device associated with the electronic financial service to accept or deny the request.

2. The method of claim 1, wherein a pair of the one metric is assigned a value selected from a set including −1, 0, and 1.

3. The method of claim 1, wherein a pair of the one metric is assigned a value selected from a set including 1 and 2.

4. The method of claim 3, wherein the pair of the one metric is assigned the value of two in response to a first member for the pair being greater than the predetermined threshold and a second member of the pair being less than the predetermined threshold.

5. A computer-based system, comprising:
    a processor; and
    a tangible, non-transitory memory configured to communicate with the processor, the tangible, non-transitory memory having computer-executable instructions stored thereon that, in response to execution by the processor, cause a computerized risk analysis system to perform operations comprising:
        training the computerized risk analysis system to detect and prevent fraudulent online activity associated with at least one merchant, said training comprising performing a continuous, iterative validation of electronic transaction data via an executed loss function algorithm based at least on a Gini metric derived from an area under curve (AUC) plot and a capture rate metric of labeled data within the electronic transaction data, wherein the training further comprises:
            swapping, by the computerized risk analysis system, a first value and a second value from one metric of the Gini metric and the capture rate metric in response to the first value being lower than a predetermined threshold;
        dynamically generating and updating, via the computerized risk analysis system, a risk assessment model, such that the risk assessment model is updated in accordance with the training of the computerized risk analysis system;
        receiving, by the computerized risk analysis system, a request for an electronic transaction via an electronic financial service;
        generating, by the computerized risk analysis system, a risk assessment by applying the risk assessment model to factors associated with the electronic transaction; and
        deciding, by the computerized risk analysis system, on the request in response to the generated risk assessment, said decision triggering a point-of-sale (POS) device associated with the electronic financial service to accept or deny the request.

6. The computer-based system of claim 5, wherein a pair of the one metric is assigned a value selected from a set including −1, 0, and 1.

7. The computer-based system of claim 5, wherein a pair of the one metric is assigned a value selected from a set including 1 and 2.

8. The computer-based system of claim 7, wherein the pair of the one metric is assigned the value of two in response to a first member for the pair being greater than the predetermined threshold and a second member of the pair being less than the predetermined threshold.

9. An article of manufacture including a non-transitory, tangible computer readable storage medium having instructions stored thereon that, in response to execution by a risk analysis system, cause a computing device to perform operations comprising:
    training the risk analysis system to detect and prevent fraudulent online activity associated with at least one merchant, said training comprising performing a continuous, iterative validation of electronic transaction data via an executed loss function algorithm based at least on a Gini metric derived from an area under curve (AUC) plot and a capture rate metric of labeled data within the electronic transaction data, wherein the training further comprises:

swapping, by the computing device, a first value and a second value from one metric of the Gini metric and the capture rate metric in response to the first value being lower than a predetermined threshold;

dynamically generating and updating, via the risk analysis system, a risk assessment model, such that the risk assessment model is updated in accordance with the training of the risk analysis system;

receiving, by the risk analysis system, a request for an electronic transaction via an electronic financial service;

generating, by the risk analysis system, a risk assessment by applying the risk assessment model to factors associated with the electronic transaction; and deciding, by the risk analysis system, on the request in response to the generated risk assessment, said decision triggering a point-of-sale (POS) device associated with the electronic financial service to accept or deny the request.

10. The article of claim 9, wherein a pair of the one metric is assigned a value selected from a set including −1, 0, and 1.

11. The article of claim 9, wherein a pair of the one metric is assigned a value of two in response to a first member of the pair being greater than a predetermined threshold and a second member of the pair being less than the predetermined threshold.

12. The method of claim 1, wherein the electronic transaction data is validated via the executed loss function algorithm based at least on the Gini metric, the capture rate metric of labeled data within the electronic transaction data, and an accuracy metric.

13. The method of claim 1, wherein the risk assessment is generated by assigning a score to the electronic transaction based on the risk assessment model, wherein the request is decided based on the assigned score.

14. The computer-based system of claim 5, wherein the electronic transaction data is validated via the executed loss function algorithm based at least on the Gini metric, the capture rate metric of labeled data within the electronic transaction data, and an accuracy metric.

15. The computer-based system of claim 5, wherein the risk assessment is generated by assigning a score to the electronic transaction based on the risk assessment model, wherein the request is decided based on the assigned score.

16. The article of claim 9, wherein the electronic transaction data is validated via the executed loss function algorithm based at least on the Gini metric, the capture rate metric of labeled data within the electronic transaction data, and an accuracy metric.

17. The article of claim 9, wherein the risk assessment is generated by assigning a score to the electronic transaction based on the risk assessment model, wherein the request is decided based on the assigned score.

\* \* \* \* \*